United States Patent
Nakanishi

(10) Patent No.: US 6,198,932 B1
(45) Date of Patent: Mar. 6, 2001

(54) CONTROLLER FOR USE WITH A RADIOCOMMUNICATIONS SYSTEM

(75) Inventor: Hitoshi Nakanishi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/114,767

(22) Filed: Jul. 14, 1998

(30) Foreign Application Priority Data

Jul. 29, 1997 (JP) .................................................... 9-217011

(51) Int. Cl.⁷ ...................................................... H04B 7/00
(52) U.S. Cl. .......................... 455/450; 455/435; 455/445; 455/554; 455/560
(58) Field of Search ..................................... 455/450, 452, 455/453, 454, 561, 524, 525, 443, 435, 442, 445, 554, 560

(56) References Cited

U.S. PATENT DOCUMENTS

| | | | |
|---|---|---|---|
| 5,121,391 | * 6/1992 | Paneth et al. ...................... 370/95.1 |
| 5,297,193 | 3/1994 | Bouix et al. . | |
| 5,448,752 | * 9/1995 | Mabey .................................. 455/33.1 |
| 5,983,112 | * 11/1999 | Kay ........................................ 455/504 |
| 6,047,176 | * 4/2000 | Sakamoto et al. .................... 455/422 |

FOREIGN PATENT DOCUMENTS 2 282 299    3/1995  (GB) .

* cited by examiner

Primary Examiner—Thanh Cong Le
Assistant Examiner—Thuan T. Nguyen
(74) Attorney, Agent, or Firm—Pearne & Gordon LLP

(57) ABSTRACT

A controller for use with a radiocommunications system includes a control slot frequency management section 12 which manages the frequency of a control slot assigned to each of the base stations; a broadcast call area number management section 16 which manages broadcast call area numbers registered for the purpose of preventing the positions of the mobile stations from being registered in the adjacent base stations in an overlapping manner; and a control slot frequency allocation section 17 which sets the details of the control slot frequency management section in such a way that control channels of different frequencies are allocated to a plurality of base stations assigned the same broadcast area number.

2 Claims, 8 Drawing Sheets

FIG. 3

| CS NO. | BROADCAST CALL AREA NUMBER (BROADCAST CALL AREA NUMBER MANAGEMENT SECTION CONTENTS) | FREQUENCY (CONTROL SLOT FREQUENCY MANAGEMENT SECTION CONTENTS) | PERIOD (CONTROL SLOT PERIOD MANAGEMENT SECTION CONTENTS) | CONTROL SLOT |
|---|---|---|---|---|
| 1 | 1 | f1 | a | A |
| 2 | 1 | f2 | a | E |
| 3 | 2 | f1 | b | B |
| 4 | 3 | f1 | c | C |
| 5 | 4 | f1 | d | D |
| 6 | 4 | f2 | b | F |
| 7 | 5 | f2 | c | G |
| 8 | 6 | f2 | d | H |

FIG. 5

| CS NO. | BROADCAST CALL AREA NUMBER (BROADCAST CALL AREA NUMBER MANAGEMENT SECTION CONTENTS) | FREQUENCY (CONTROL SLOT FREQUENCY MANAGEMENT SECTION CONTENTS) | PERIOD (CONTROL SLOT PERIOD MANAGEMENT SECTION CONTENTS) | CONTROL SLOT |
|---|---|---|---|---|
| 1 | 1 | f1 | a | A |
| 2 | 1 | f1 | c | C |
| 3 | 2 | f1 | b | B |
| 4 | 3 | f1 | d | D |
| 5 | 4 | f2 | a | E |
| 6 | 4 | f2 | c | G |
| 7 | 5 | f2 | b | F |
| 8 | 6 | f2 | d | H |

FIG. 7

| CS NO. | BROADCAST CALL AREA NUMBER | FREQUENCY (CONTROL SLOT FREQUENCY MANAGEMENT SECTION CONTENTS) | PERIOD (CONTROL SLOT PERIOD MANAGEMENT SECTION CONTENTS) | CONTROL SLOT |
|---|---|---|---|---|
| 1 | 1 | f1 | a | A |
| 2 | 1 | f1 | b | B |
| 3 | 2 | f1 | c | C |
| 4 | 3 | f1 | d | D |
| 5 | 4 | f2 | a | E |
| 6 | 4 | f2 | b | F |
| 7 | 5 | f2 | c | G |
| 8 | 6 | f2 | d | H |

CONTROLLER FOR USE WITH A RADIOCOMMUNICATIONS SYSTEM

BACKGROUND OF THE INVENTION

1. Field of the Invention

The present invention relates to a controller for use with a radiocommunications system which controls a plurality of base stations connected to mobile telephones via a radio channel within a business establishment, and more particularly, to a control operation for the purpose of allocating control slots to the base stations, respectively.

2. Description of the Related Art

FIG. 6 is a block diagram showing an existing radiocommunications system used in a business establishment, wherein a PBX (private branch exchange) main unit 1 is connected to a plurality of base stations 2 and to a personal computer PC 3 used for customizing the PBX 1.

The PBX main unit 1 comprises a PBX control section 11 for controlling the overall PBX main unit 1, a control slot frequency management section 12 which manages the frequency of a control slot assigned to each of the base stations 2, a control slot period management section 13 for managing a period of the control slot during which a radio frequency signal is transmitted from the base station 2, a base station interface 14 which serves as an interface between the PBX main unit 1 and the base stations 2, a PC interface 15 which serves as an interface between the PBX unit 1 and the PC 3, and a broadcast call area number management section 16 which manages a broadcast call area number registered for the purpose of preventing the positions of mobile stations from being registered in the adjacent base stations 2 in an overlapping manner.

Each of the base stations 2 comprises a PBX interface 21 which serves as an interface between the PBX main unit 1 and the base station 1, a base station control section 22 for controlling the entire base station 2, a control slot management section 23 which stores the frequency and period of the control slot assigned to each of the base stations 2, and a radio section 24 which emits a radio frequency signal.

At the time of designing of the base stations, with regard to the adjacent base stations 2, the PC 3 sets an identical broadcast call area number in the broadcast call area number management sections 16 by way of the PC interface 15. In a case where a mobile station is handed over from one zone to another zone of the base stations 2 assigned the same broadcast call area number, the position of the mobile station is not registered in the base station.

The PBX control section 11 allocates control slots to the base stations 2 in numerical order of ports of the PBX main unit 1 and thus-allocated control slots are stored in the control slot frequency management section 12 and the control slot period management section 13. Details of allocation of the control slots are stored in the control slot management section 23 of each base station 2 by way of the base station interface 14 and the PBX interface 21. Depending on the settings of the control slot management section 23, each base station 2 determines the frequency and period of the control slot during which a radio frequency signal is transmitted from the base station 2.

FIG. 7 is a table showing broadcast call area numbers respectively assigned to base stations CS1 to CS8, frequencies (i.e., the details of the control slot frequency management section 12) f1 and f2, periods (i.e., details of the control slot period management section 13) "a"–"d" of the respective control slots, and control slots A through H.

FIG. 8 is a schematic representation showing the control slots A to H allocated respectively to the four periods "a" to "d" during one cycle of control channels of two frequencies f1 and f2.

FIG. 7 shows base stations CS1 and CS2 assigned the same broadcast call area number, i.e., 1, and base stations CS5 and CS6 assigned the same broadcast call area number, i.e., 4. The base stations assigned the same broadcast area number are positioned in close proximity to each other. Other base stations CS3, CS4, CS7, and CS8 are not positioned in close proximity to one another, and hence they are respectively assigned individual broadcast call area numbers 2, 3, 5, and 6.

The base stations CS1 to CS4 are allocated a control channel of frequency f1, and the base stations CS5 to CS8 are allocated a control channel of frequency f2. The base stations CS1 to CS4 are respectively sequentially assigned the four periods "a" to "d" into which one cycle of the control channel of frequency f1 is divided. Similarly, the base stations CS5 to CS8 are sequentially and respectively assigned the four periods "a" to "d" into which one cycle of the control signal of frequency f2 is divided. Consequently, as shown in FIG. 8, the base stations CS1 to CS4 are respectively allocated the control slots A to D, and the base stations CS5 to CS8 are respectively allocated the control slots E to H.

If existing radiocommunications systems are provided in close proximity to each other, and if control slots which one of the systems attempts to use have already been used by the other system, it becomes impossible for the former system to control mobile stations existing in a service area covered by base stations of the former system.

FIG. 9 shows a schematic layout showing an example of the adjacent radiocommunications systems and their base stations. Base stations CS1, CS2, and CS3 are connected to one PBX main unit 1A. Base stations CSa and CSb are connected to another PBX main unit B. In this example, the base stations CS1, CS2, and CSa are positioned in close proximity to one another. In this layout, the rate of connection between the mobile station and the base station CS1 or CS2 is decreased by interference from the base station CSa.

SUMMARY OF THE INVENTION

The present invention has been conceived to solve the aforementioned drawback in the prior art, and an object of the present invention is to provide a controller for use with a radiocommunications system which prevents a decrease in the rate of connection among mobile stations and base stations of the system, which would otherwise be caused by interference resulting from another adjacent radiocommunications system using the same frequency band as that of the system.

To achieve the above object, a controller for use with a radiocommunications system according to the present invention, comprises:

a control slot frequency management section which manages the frequency of a control slot allocated to each of base stations;

a broadcast call area number management section which manages broadcast call area numbers registered for the purpose of preventing the position of a mobile station from being registered in the adjacent base stations; and a control slot frequency allocation section which sets the details of the control slot frequency management section in such a way that control channels of different frequencies are allocated to a plurality of base stations assigned the same broadcast area number.

The present invention is capable of providing a controller for use with a radiocommunications system which prevents a decrease in the rate of connection among mobile stations and base stations of the system, which would otherwise be caused by interference from another adjacent radiocommunications system which uses the same frequency band as that of the system.

A first aspect of the present application is directed to a controller for use with a radiocommunications system which controls a plurality of base stations connected to mobile stations by way of radio channels, the controller comprising:

a control slot frequency management section which manages the frequency of a control slot assigned to each of the base stations;

a broadcast call area number management section which manages broadcast call area numbers registered for the purpose of preventing the positions of the mobile stations from being registered in the adjacent base stations in an overlapping manner; and a control slot frequency allocation section which sets the details of the control slot frequency management section in such a way that control channels of different frequencies are allocated to a plurality of base stations assigned the same broadcast area number.

According to the present invention, if a decrease arises in the rate of connection among the mobile stations and the base stations of one radiocommunications system by interference from another adjacent radiocommunications system using the same frequency band as that of the system, control channels of different frequencies are allocated to the base stations assigned the same broadcast area number.

A second aspect of the present application is directed to a controller for use with a radiocommunications system which controls a plurality of base stations connected to mobile stations by way of radio channels, the controller comprising:

a control slot period management section which manages the period of the control slot allocated to each base station during which a radio frequency signal is transmitted;

a broadcast call area number management section which manages broadcast call area numbers registered for the purpose of preventing the positions of the mobile stations from being registered in the adjacent base stations in an overlapping manner; and a control slot period allocation section which sets the details of the control slot period management section in such a way that control slots spaced intervals apart from one another are allocated to the plurality of base stations assigned the same broadcast area number.

According to the present invention, if a decrease arises in the rate of connection among the mobile stations and the base stations of one radiocommunications system by interference from another adjacent radiocommunications system using the same frequency band as that of the system, control channels spaced at timing apart from one another are allocated to the base stations assigned the same broadcast area number.

BRIEF DESCRIPTION OF THE DRAWINGS

FIG. 3 is a table showing broadcast area numbers assigned respectively to base stations, frequencies assigned to control slots, transmission periods allocated to the control slots, and the control slots;

FIG. 5 is a table showing broadcast area numbers assigned respectively to base stations, frequencies assigned to control slots, transmission periods allocated to the control slots, and the control slots;

FIG. 7 is a table showing broadcast area numbers assigned respectively to existing base stations, frequencies assigned to control slots, transmission periods allocated to the control slots, and the control slots;

DETAILED DESCRIPTION OF THE PREFERRED EMBODIMENTS

Preferred embodiments of the present invention will be described by reference to FIGS. 1 to 5.

(First Embodiment)

Figure 1:
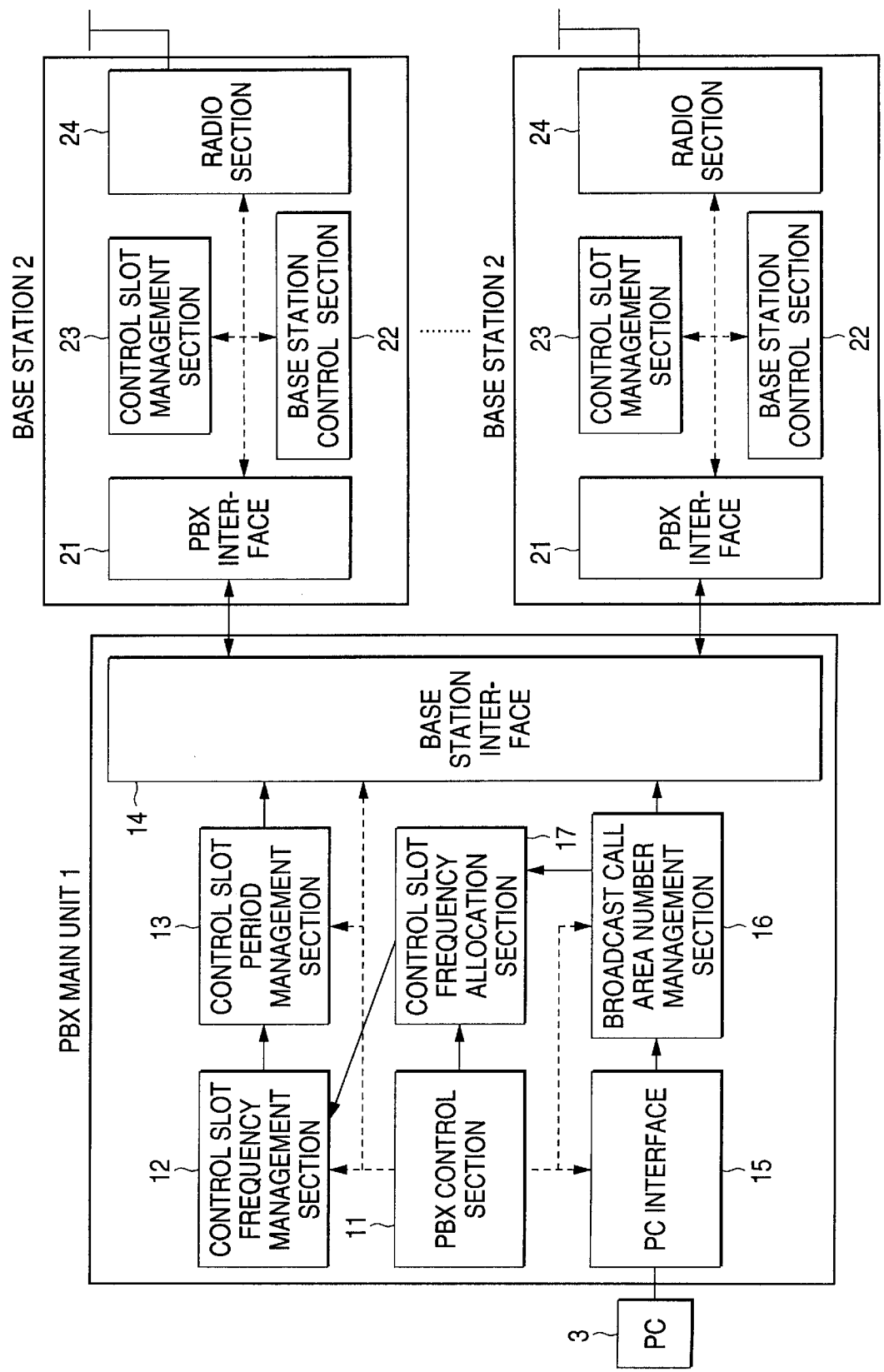
FIG. 1 is a block diagram showing a first embodiment of a radiocommunications system to which the present invention is applied.
Figure 6:
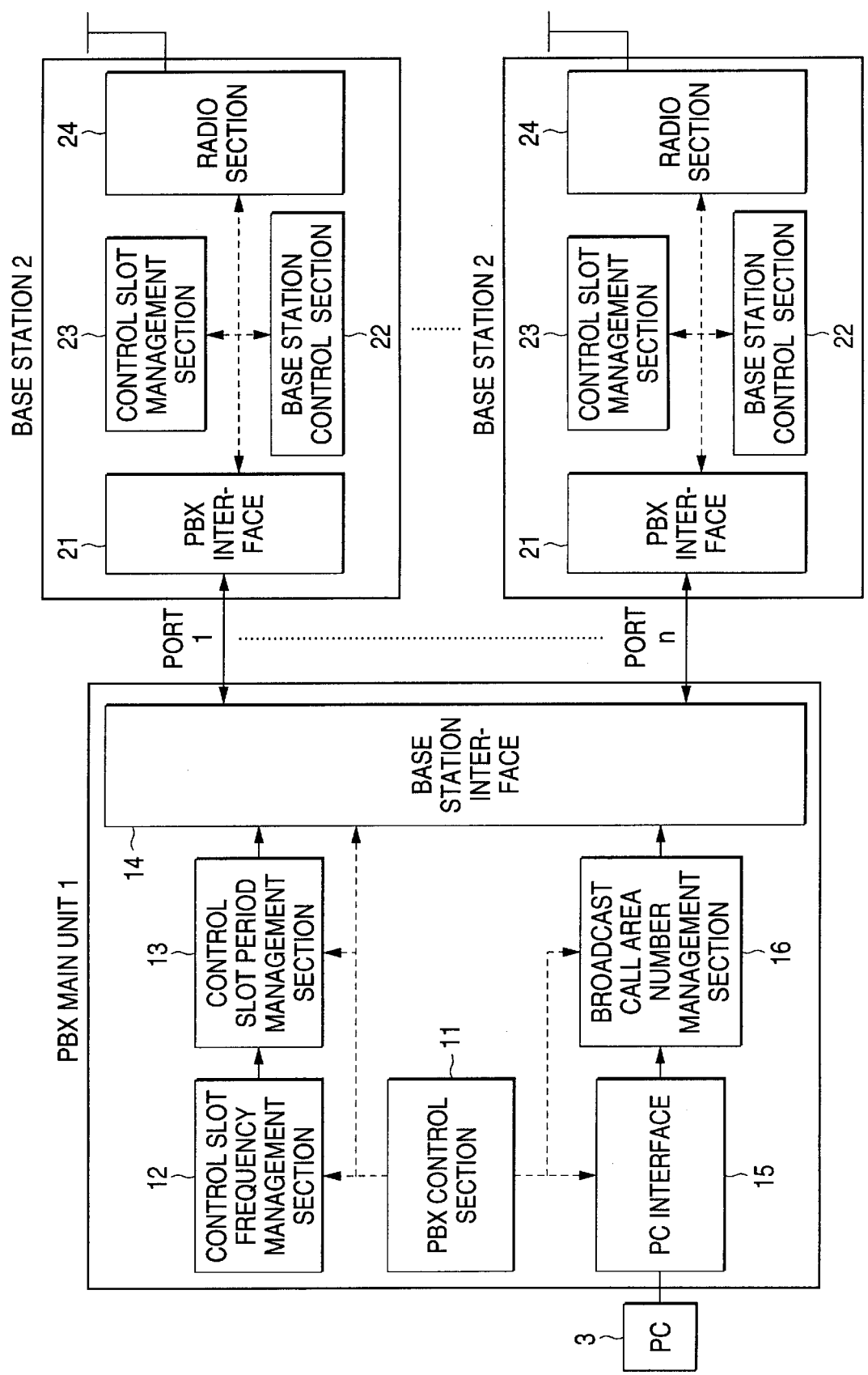
FIG. 6 is a block diagram showing an existing communications system.
Figure 8:
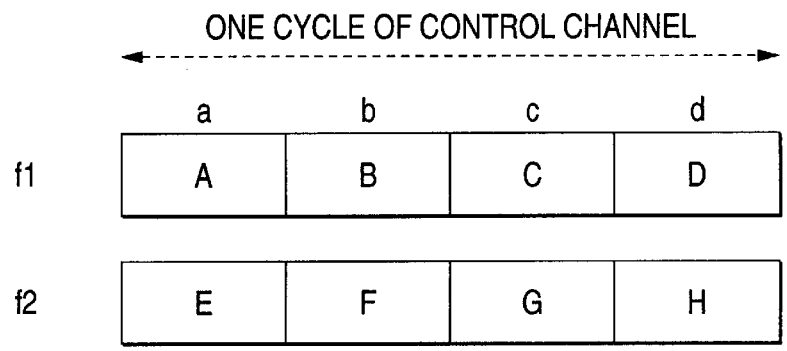
FIG. 8 is a schematic representation showing allocation of control slots to two control channels.
Figure 9:
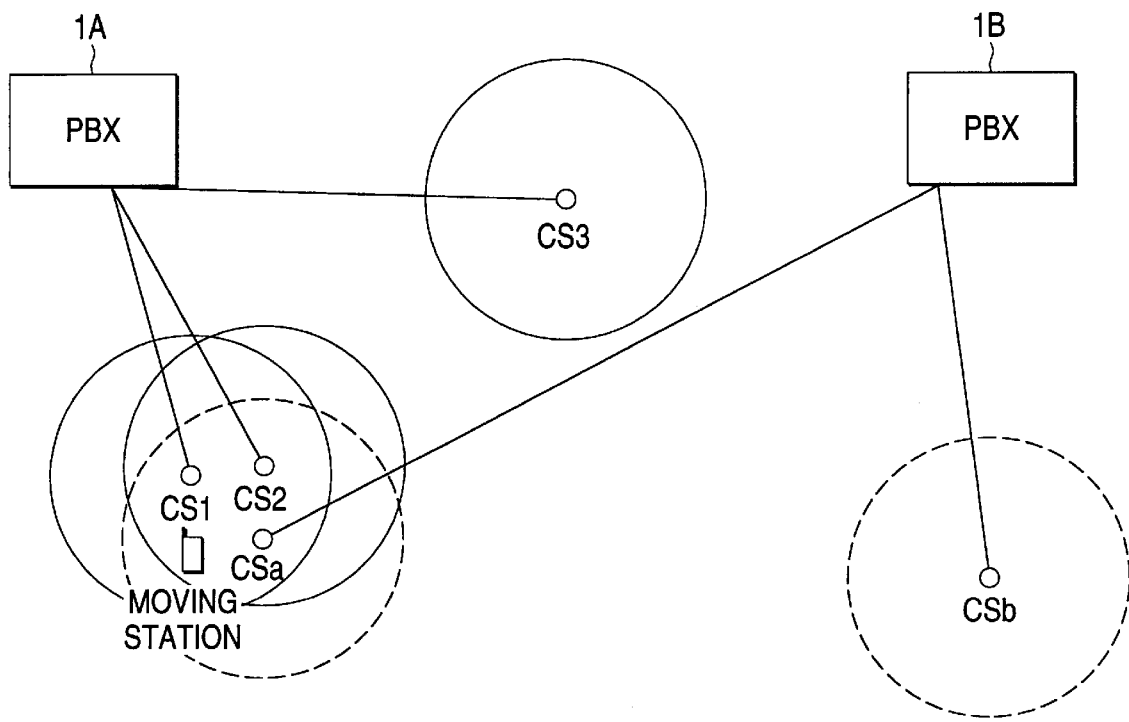
FIG. 9 is a schematic representation showing the positional relationship between a PBX main unit and base stations.

FIG. 1 is a block diagram showing a first embodiment of a radiocommunications system to which the present invention is applied. In the drawing, the same reference numerals are assigned to constituent elements which are the same as those shown in FIG. 6, and their detailed explanations will be omitted here.

In the first embodiment, the control slot frequency allocation section 17 is newly provided in the PBX main unit 1. If there are the base stations 2 assigned the same broadcast area number stored in the broadcast area number management section 16, the control slot frequency allocation section 17 sets the details of the control slot frequency management section 12 so as to allocate control slots of different frequencies to these base stations 2. The PBX main unit 1 constitutes the controller for use with a radiocommunications system according to the present invention. In other respects, the PBX main unit 1 is the same in structure as that previously shown in FIG. 6.

The details of settings of the control slot frequency management section 12 are stored in the control slot management section 23 by way of the base station interface 14 and the PBX interface 21, together with the details of the control slot period management section 13 set by the PBX control section 11. The base station 2 determines a period of the control slot during which the radio section 24 transmits a radio frequency signal.

Figure 2:
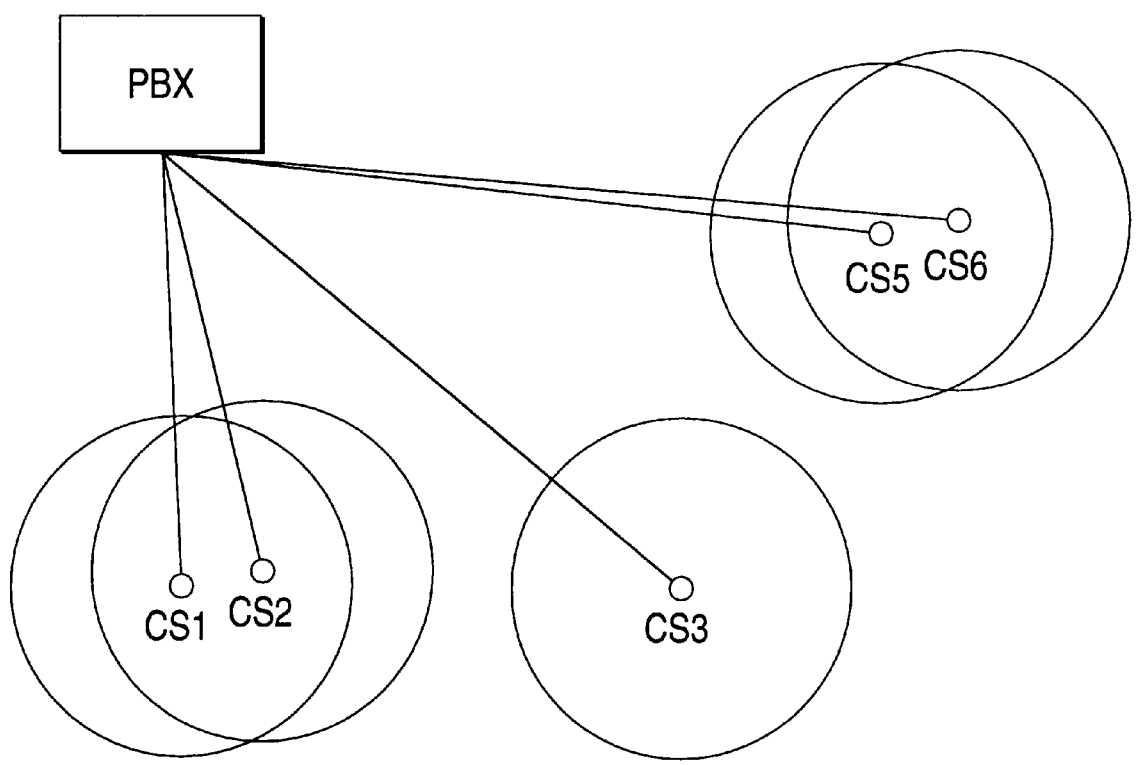
FIG. 2 is a schematic representation showing the positional relationship between the PBX main unit and base stations.

FIG. 2 is a schematic representation showing the positional relationship between the PBX main unit 1 and the base stations CS1 to CS8. In this example, the base stations CS1 and CS2 are positioned in close proximity to each other, and the base stations CS5 and CS6 are also positioned in close proximity to each other. The other base stations are positioned independently of one another. Here, the base stations CS4, CS7, and CS8 are omitted from the drawing.

FIG. 3 is a table showing broadcast area numbers assigned respectively to the base stations CS1 to CS8 thus arranged, the frequencies f1 and f2 assigned to the control slots, the transmission periods "a" to "d" allocated to the control slots, and the control slots A to H.

As shown in FIG. 3, since the base stations CS1 and CS2 are positioned in close proximity to each other, they are assigned the same broadcast call area number 1, and the base station CS3 is assigned broadcast call area number 2. The base station CS4 is assigned broadcast call area number 3. Since the base stations CS5 and CS6 are positioned in close proximity to each other, they are assigned the same broadcast call area number 4, and the base station CS7 is assigned broadcast call area number 5. The base station CS8 is assigned the broadcast call area number 6.

In principle, the base stations CS1 to CS4 are assigned a control channel of frequency f1. However, since the base stations CS1 and CS2 are positioned in close proximity to each other, the base stations CS2 is assigned a control channel of frequency f2.

In principle, the base stations CS5 to CS8 are assigned the control channel of frequency f2. However, since the base stations CS5 and CS6 are positioned in close proximity to each other, the base stations CS5 is assigned the control channel of frequency f1.

With regard to assignment of the periods "a" to "d" in the control channel of frequency f1, the period "a" is assigned to the base station CS1, and the period "b" is assigned to the base station CS3. The period "c" is assigned to the base station CS4, and the period "d" is assigned to the base station CS5. With regard to assignment of the periods in the control frequency of frequency f2, the period "a" is assigned to the base station CS2, and the period "b" is assigned to the base station CS5. The period "c" is assigned to the base station CS7, and the period "d" is assigned to the base station CS8.

As a result, the control slots A to H are allocated to the base stations CS1 to CS8 as follows: Namely, the base station CS1 is allocated the control slot A, and the base station CS2 is allocated the control slot E. The base station CS3 is allocated the control slot B, and the base station CS4 is allocated the control slot C. The base station CS5 is allocated the control slot D, and the base station CS6 is allocated the control slot F. The base station CS7 is allocated the control slot G, and the base station CS8 is allocated the control slot H.

As mentioned previously, according to the first embodiment, if a decrease arises in the rate of connection among mobile stations and base stations of one radiocommunications system by interference from another adjacent radiocommunications system using the same frequency band as that of the system, control channels of different frequencies are allocated to the base stations assigned the same broadcast area number.

(Second Embodiment)

Figure 4:
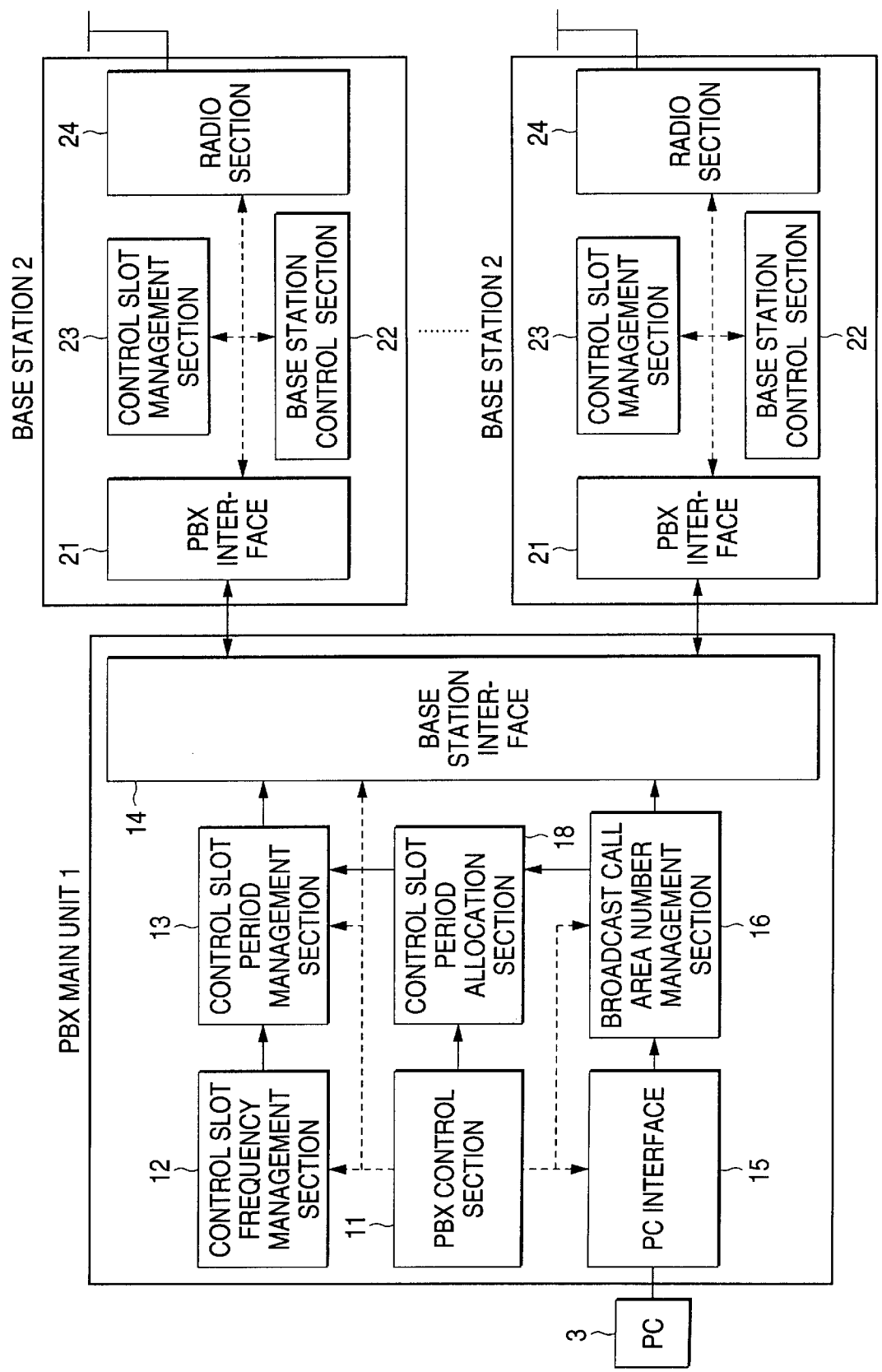
FIG. 4 is a block diagram showing a second embodiment of a radiocommunications system to which the present invention is applied.

FIG. 4 is a block diagram showing a second embodiment of the radiocommunications system to which the present invention is applied. In the drawing, the same reference numerals are assigned to constituent elements which are the same as those shown in FIG. 6, and their detailed explanations will be omitted here.

In the second embodiment, the control slot period allocation section 18 is newly provided in the PBX main unit 1. If there are the base stations 2 assigned the same broadcast area number stored in the broadcast area number management section 16, the control slot period allocation section 18 sets the details of the control slot period management section 13 so as to allocate control slots spaced at timing apart from one another to these base stations 2. The PBX main unit 1 constitutes the controller for use with a radiocommunications system according to the present invention. In other respects, the PBX main unit 1 is the same in structure as that previously shown in FIG. 6.

The details of settings of the control slot period management section 13 are stored in the control slot management section 23 by way of the base station interface 14 and the PBX interface 21, together with the details of the control slot period management section 12 set by the PBX control section 11. The base station 2 determines the period of the control slot during which the radio section 24 transmits a radio frequency signal.

FIG. 5 is a table showing broadcast area numbers assigned respectively to the base stations CS1 to CS8 thus arranged, the frequencies f1 and f2 assigned to the control slots, the periods "a" to "d" allocated to the control slots, and the control slots A to H, provided that the PBX main unit 1 and the base stations CS1 to CS8 are arranged in a manner as shown in FIG. 2.

The broadcast call area numbers provided in FIG. 5 are the same as those previously used in the first embodiment. The base stations CS1 to CS4 are assigned the control channel of frequency f1, and the base stations CS5 through CS8 are assigned the control channel of frequency f2.

In principle, the periods "a" to "d" are assigned to the base stations CS1 to CS4 in that order, as well as to the base stations CS5 to CS8 in that order. Since the base stations CS1 and CS2 are positioned in close proximity to each other, the base station CS1 is assigned the period "a," and the base station CS2 is assigned the period "c" in order to assign transmission periods spaced apart from each other to the base stations CS1 and CS2. Similarly, since the base stations CS5 and CS6 are positioned in close proximity to each other, the base station CS5 is assigned the period "a," and the base station CS6 is assigned the period "c."

With regard to the assignment of periods to the remaining base stations, the period "b" in the control channel of frequency f1 is assigned to the base station CS3, and the period "d" in the control channel of frequency f1 is assigned to the base station CS4. The period "b" in the control channel of frequency f2 is assigned to the base station CS7, and the period "d" in the control channel of frequency f2 is assigned to the base station CS8.

As a result, the control slots A to H are allocated to the base stations CS1 to CS8 as follows: Namely, the base station CS1 is allocated the control slot A, and the base station CS2 is allocated the control slot C. The base station CS3 is allocated the control slot B, and the base station CS4 is allocated the control slot D. The base station CS5 is allocated the control slot E, and the base station CS6 is allocated the control slot G. The base station CS7 is allocated the control slot F, and the base station CS8 is allocated the control slot H.

As mentioned previously, according to the second embodiment, if a decrease arises in the rate of connection among mobile stations and base stations of one communications system by interference from another adjacent radiocommunications system using the same frequency band as that of the system, control slots spaced at timing apart from each other are allocated to the radiocommunications systems assigned the same broadcast area call number, thus enabling an increase in the rate of connection among the mobile stations and the base stations of the system in its area.

As was described above, according to the present invention, if a decrease arises in the rate of connection among mobile stations and base stations of one radiocommunications system by interference from another radiocommunications system using the same frequency band as that of the system, the base stations assigned the same broadcast call area number are allocated control channels of different frequencies or control channels spaced at timing from one another, enabling an increase in the rate of connection among the mobiles stations and the base stations of the system in its area.

What is claimed is:

1. A controller for use with a radiocommunications system which controls a plurality of base stations connected to mobile stations by way of radio channels, said controller comprising:

a control slot frequency management section for managing the frequency of a control slot assigned to each of the base stations;

a broadcast call area number management section for managing broadcast call area numbers registered for the purpose of preventing the positions of the mobile stations from being registered in the adjacent base stations in an overlapping manner, and such that base stations having overlapping coverage areas are registered with the same broadcast call area number; and a control slot frequency allocation section for setting the details of the control slot frequency management section such that control channels of different frequencies are allocated to a plurality of base stations assigned the same broadcast area number, and such that base stations registered with the same broadcast call area number are each assigned a different frequency.

2. A controller for use with a radiocommunications system which controls a plurality of base stations connected to mobile stations by way of radio channels, said controller comprising:

a control slot period management section which manages the period of the control slot allocated to each base station during which a radio frequency signal is transmitted;

a broadcast call area number management section which manages broadcast call area numbers registered for the purpose of preventing the positions of the mobile stations from being registered in the adjacent base stations in an overlapping manner, such that base stations having overlapping coverage areas are registered with the same broadcast call area number; and a control slot period allocation section which sets the details of the control slot period management section in such a way that control slots spaced intervals apart from one another are allocated to the plurality of base stations assigned the same broadcast call area number, and such that base stations are registered with the same broadcast call area number and the control slots spaced intervals apart from one another are assigned to the base stations, respectively.

* * * * *